M. SWARTZ.
INSECT TRAP.
APPLICATION FILED NOV. 20, 1907.
963,483.
Patented July 5, 1910.
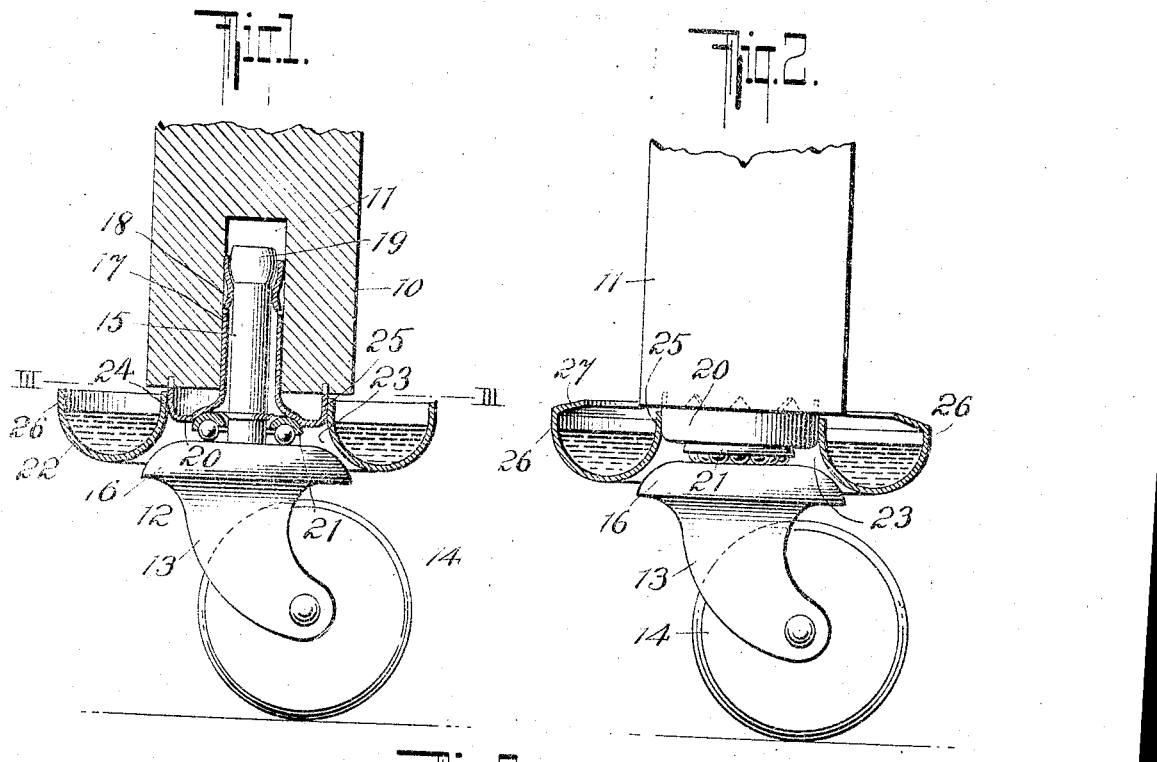
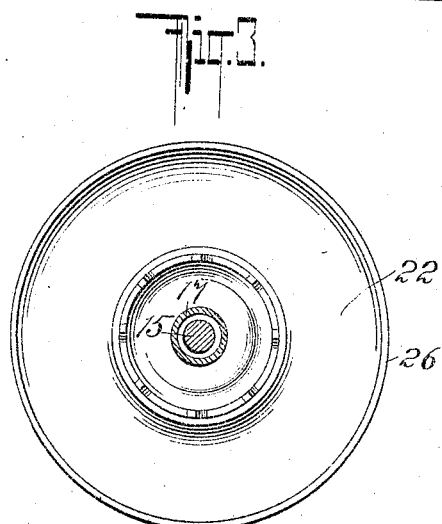
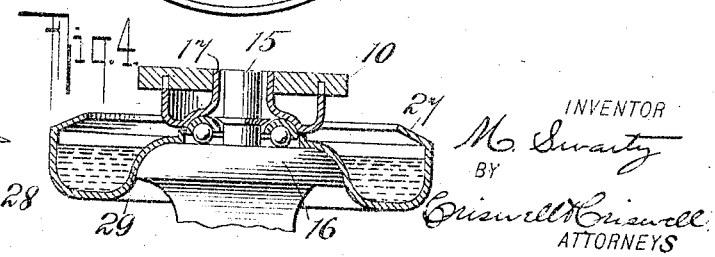
WITNESSES:
INVENTOR
M. Swartz
BY
Criswell & Criswell
ATTORNEYS

UNITED STATES PATENT OFFICE.

MAURICE SWARTZ, OF ENGLEWOOD, NEW JERSEY.

INSECT-TRAP.

963,483.

Specification of Letters Patent. Patented July 5, 1910.

Application filed November 20, 1907. Serial No. 403,020.

*To all whom it may concern:*

Be it known that I, MAURICE SWARTZ, a citizen of the United States, and a resident of Englewood, county of Bergen, and State of New Jersey, have invented certain new and useful Improvements in Insect-Traps, of which the following is a full, clear, and exact description.

This invention relates more particularly to a trap adapted to be applied to the posts or legs of a bedstead.

As is well known, one of the serious problems met by good housekeepers, no matter how cleanly and how much care may be exercised, is in keeping the beds clear of bugs. I have found in many instances that bugs will creep along the floor and enter the bed by climbing the legs or posts thereof, which necessitates the repeated cleaning of the bed.

The primary object of the invention is to provide a simple and efficient trap which may be readily applied to casters of bedsteads, and be supported thereby in such a way above the floor that the bugs or insects will be compelled to enter the trap in their attempt to climb the bed-posts, thereby effectually obstructing further progress of the bugs, and to hold the insects or bugs within the trap so that they will either be destroyed therein, or they may be caught and destroyed as occasion requires, thus keeping the bed entirely free and clear of all insects.

A further object of the invention is to provide a simple device which may be readily applied to any bedstead, and which may contain water or a suitable liquid that will kill the bug immediately it enters the trap.

With these and other objects in view, the invention will be hereinafter more particularly described with reference to the accompanying drawings, which form a part of this specification, and will then be pointed out in the claims at the end of the description.

In the drawings, Figure 1, is a vertical section, partly in elevation, of one form of device embodying my invention. Fig. 2 is a view somewhat similar to Fig. 1 in which a slightly different form of trap for containing the liquid is shown. Fig. 3 is a sectional plan view taken on the line III—III of Fig. 1; and Fig. 4 is a fragmentary vertical section showing a slightly different arrangement of the cup-shaped device forming the trap.

While I have shown the device as adapted more particularly to catching bedbugs and applied to the legs or posts of beds, it will be understood that the device may be modified somewhat or employed for other purposes and to catch vermin or insects of various kinds, such as water-bugs, roaches and the like, in which case it may be applied to the legs of sinks or other furniture or fixtures.

The posts or legs 10 of a bed or other piece of furniture may each have a recess 11 therein, and in this recess is held a suitable caster 12 which may be of the usual or of any preferred construction, and is held to the bedstead in any suitable way. As shown the caster 12 has a bracket 13, and rotatably held in said bracket is a wheel 14, and projecting upward into the recess 11 of the leg 10 is a stem or post 15, which is carried by the shoulder 16 of the caster bracket.

A sleeve 17 surrounds the post 15 of the caster, and fits into the recess 11 of the bedstead, and said sleeve is provided with spring tongues 18, which are adapted to be forced over the enlarged upper end 19 of the caster-post or stem. The sleeve 17 is provided with an enlarged cup-shaped and flared portion 20, the upper edge of which is provided with teeth and is adapted to be forced into the bedstead legs in the usual way, so as to hold the sleeve and caster to the bedstead. A washer 21 is rotatably held to the post of the caster, and held by said washer are a series of balls forming an anti-friction bearing between said washer and the shoulder 16. The caster and the washer 21 has a limited vertical movement in the sleeve 17, and the said washer is adapted to engage the enlarged part 20 of the sleeve so as to hold the washer stationary to permit the caster-bolt or stem to rotate within the sleeve with very little friction, all of which parts may be of the usual or of any preferred construction.

To prevent the insects from climbing along the caster, I may secure to the enlarged part 20 of the sleeve 17 a cup-shaped device or trap 22. This device is annular in form and may be of metal or of any suitable material, and is provided with a central opening 23, so as to adapt the inner wall 24 thereof to engage and be held by the vertical part 25 of the sleeve 17. The outer wall 26 of the device or trap may be substantially vertical as shown in Figs. 1 and 3, or it may have an inwardly-flared wall or flange 27 as shown in Fig. 2, and within the trap may be placed a liquid, as water or it may contain a poison which will kill the insects immediately they enter the trap. The flange portion 27 of the device is intended to prevent the liquid from splashing out of the trap should the bed be moved, and this flange is of sufficient distance from the bedstead to prevent the insects from reaching the legs 10 without first entering the trap and crossing the liquid space. As will be seen it will be necessary for the insects in attempting to climb the caster to reach the bed to pass along the device or trap 22, and enter the trap and thus be caught or be destroyed by the liquid contained within the device.

In Fig. 4 the device is quite similar to that shown in the other figures, except that the said device or trap 28 rests upon the shoulder 16 of the caster, instead of being fitted to and supported by the wall 25 of the sleeve or socket piece 17. In this construction the trap may fit loosely over the caster post, and is held from displacement by means of the part 20 of the caster sleeve, the inner wall 29 of the trap being preferably curved to conform to the contour of the shoulder 16 whatever it may be.

From the foregoing it will be seen that a simple and efficient device is provided, which may be readily applied to various forms of bedsteads or other household furniture, so as to prevent insects from climbing the support to which it is applied without being caught or destroyed; that said device is so made that it will be in the nature of an ornament to the article to which it is applied; and that said device may be employed to catch various kinds of insects.

Having thus described my invention, I claim as new and desire to secure by Letters Patent:—

1. A device of the class described, comprising a sleeve member adapted to embrace the post member of a caster, the base portion of said sleeve terminating in prongs adapted to enter the article of furniture to which the device is attached, said base portion being recessed to accommodate bearings interposed between the same and a portion of a caster, and a hollow annular member adapted to engage the base of said sleeve member.

2. A device of the class described, comprising a sleeve member adapted to embrace the post of a caster, said sleeve member terminating in an enlarged portion, said enlarged portion being formed with projections adapted to engage the article of furniture to which the device is attached, a hollow member adapted to encircle a portion of a caster bracket and conforming to the shape of said bracket, and means formed integral with the hollow member and the enlarged portion of the sleeve member for supporting bearing members.

This specification signed and witnessed, this eighteenth day of November A. D. 1907.

MAURICE SWARTZ.

Witnesses:
   Alex. Livingston, Jr.,
   Hezekiah Bulwhistle.